United States Patent

[11] 3,601,169

| [72] | Inventors | Douglas D. Hamilton<br>Mount Royal, Quebec;<br>Joseph J. R. Boivin, Montreal, Quebec,<br>both of, Canada |
|---|---|---|
| [21] | Appl. No. | 760,274 |
| [22] | Filed | Sept. 17, 1968 |
| [45] | Patented | Aug. 24, 1971 |
| [73] | Assignees | Canadian International Paper Company;<br>Quebec North Shore Paper Company<br>Montreal, Quebec; Abitibi St. Anne Paper<br>Ltd, Beupre, Quebec, Canada |
| [32] | Priority | Sept. 22, 1967 |
| [33] | | Canada |
| [31] | | 000,751 |

[54] TREE-HANDLING VEHICLE
11 Claims, 17 Drawing Figs.

[52] U.S. Cl. .................................................. 144/34 R,
144/3, 214/77
[51] Int. Cl. ........................................................ A01g 23/02
[50] Field of Search ............................................ 144/34, 309
AC, 3 D; 214/3

[56] References Cited
UNITED STATES PATENTS

| 3,236,274 | 2/1966 | Eynon ........................... | 144/312 |
| 3,289,865 | 12/1966 | Hamilton et al. ............. | 214/85 |
| 3,498,347 | 3/1970 | Vit ................................. | 144/3 |
| 1,793,545 | 2/1931 | DeRocher .................... | 144/3 |
| 3,227,295 | 1/1966 | Hamilton et al. ............. | 144/3 |
| 3,263,838 | 8/1966 | Herolf .......................... | 144/34 |
| 3,270,787 | 9/1966 | Rehnstrom ................... | 144/34 |
| 3,356,116 | 12/1967 | Brundell et al. .............. | 144/3 |

FOREIGN PATENTS

| 163,836 | 10/1963 | U.S.S.R. ....................... | 144/3 |

*Primary Examiner*—Gerald A. Dost
*Attorney*—Johnson, Marcus & Wray

ABSTRACT: A tree felling and skidding machine which includes a self-propelled mobile articulated vehicle having a cab on one chassis providing an enclosed and protected area for the operator with a boom pivotally mounted on the roof of the enclosure and vertically above the operator for continuous pivotal movement through a 360° arc. A bunk on the other chassis is operable from the cab selectively to engage and release the butt ends of logs placed thereon. The operator is supported on a pivotally mounted chair or seat having hydraulic control valves for use in manipulating the boom and accessories mounted thereon. A power source on the front chassis provides fluid pressure for the hydraulic components and is conducted through a pair of rotary couplings, one of which provides a pivotal mounting for the operator's support and the other a pivotal mount for the boom assembly on the roof of the cab. Attached to the free end of the boom is a felling head consisting of a grapple and shear mechanism rigidly attached to a frame and each having movable jaws for engaging a tree at positions spaced longitudinally therealong.

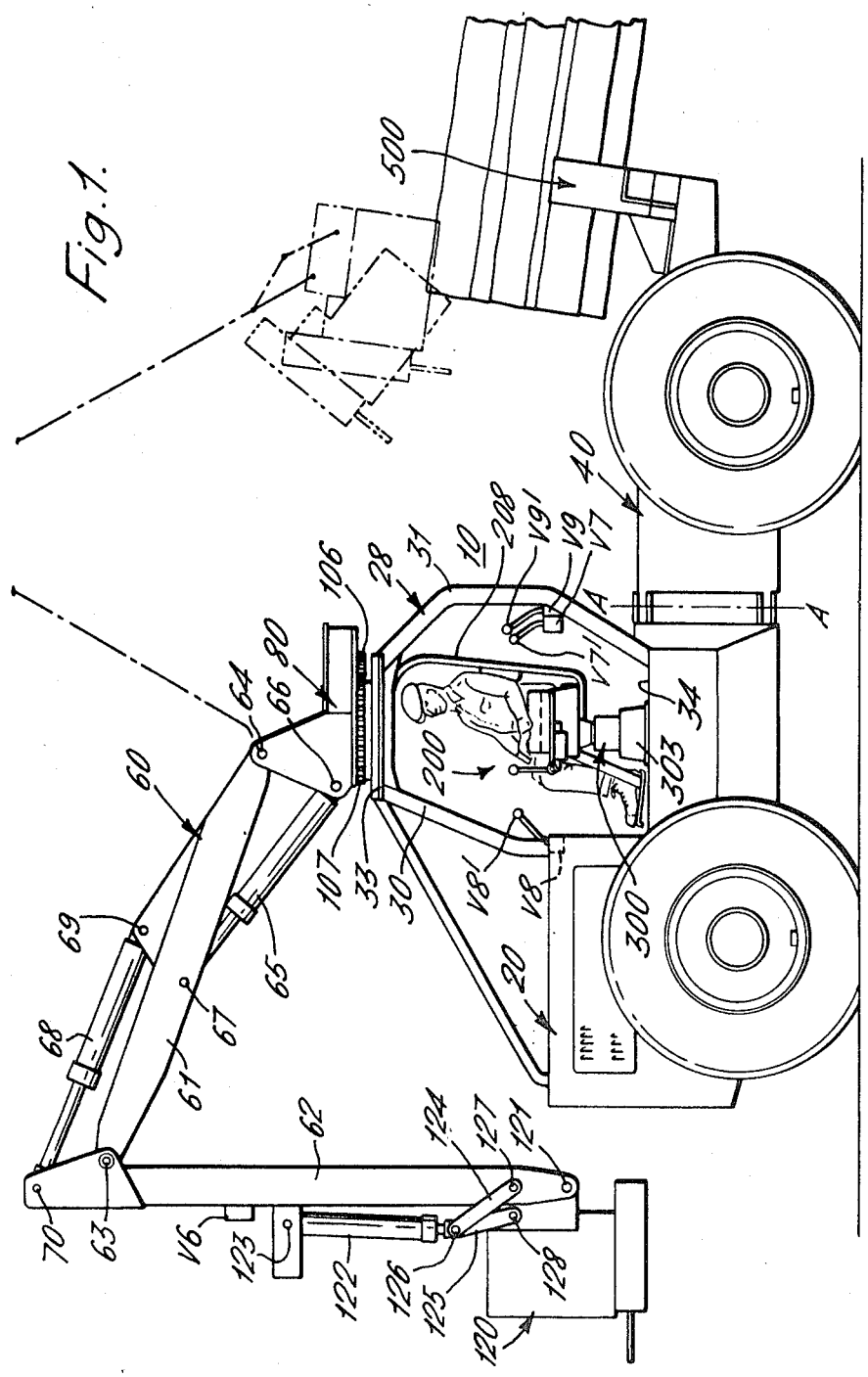

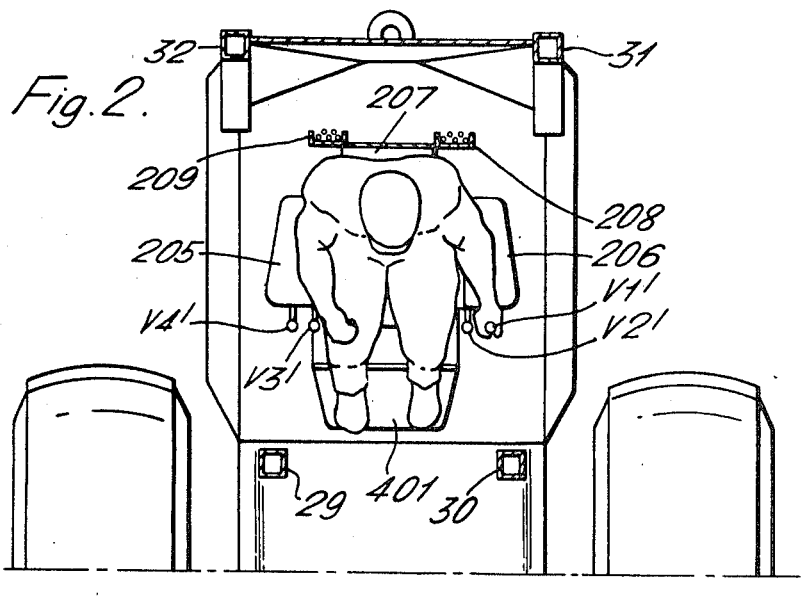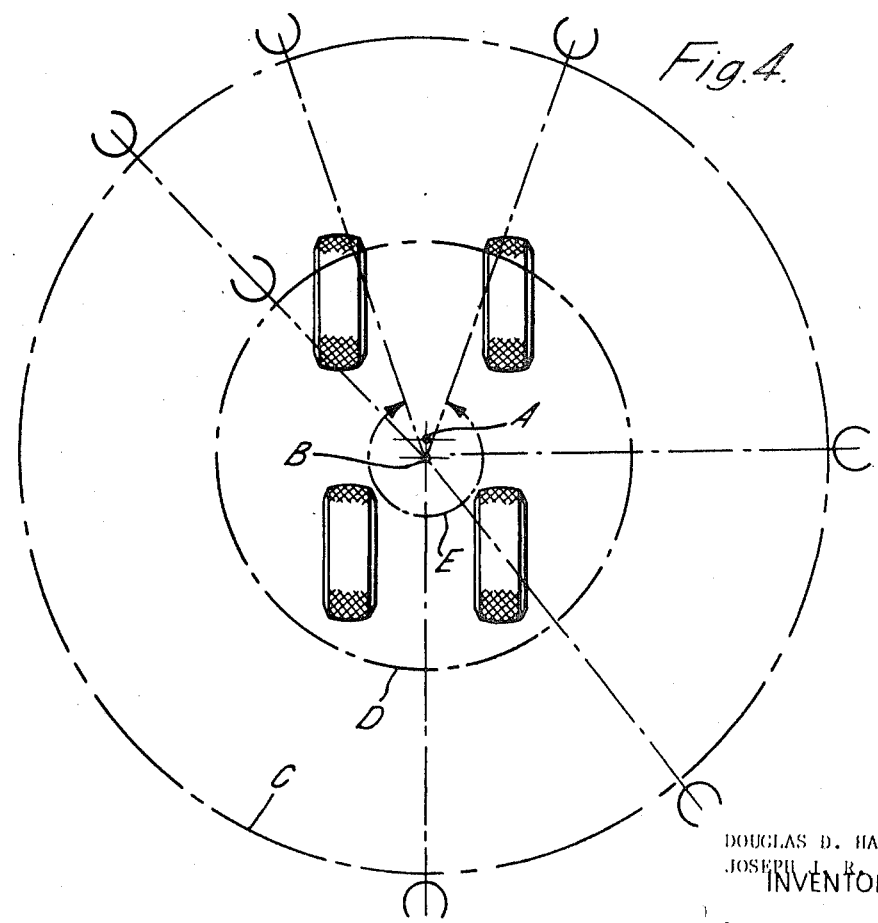

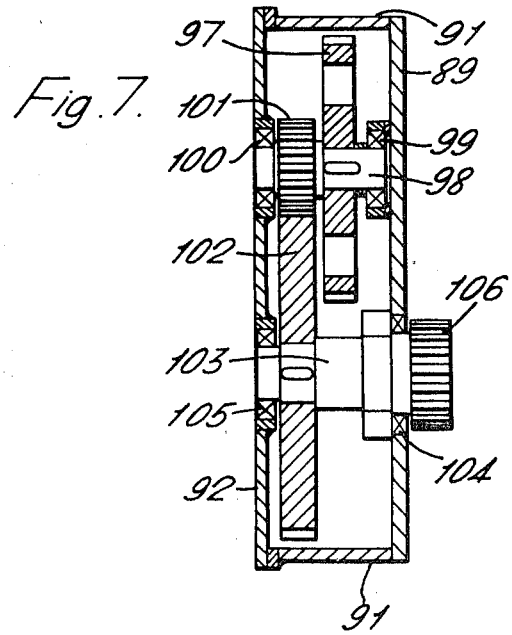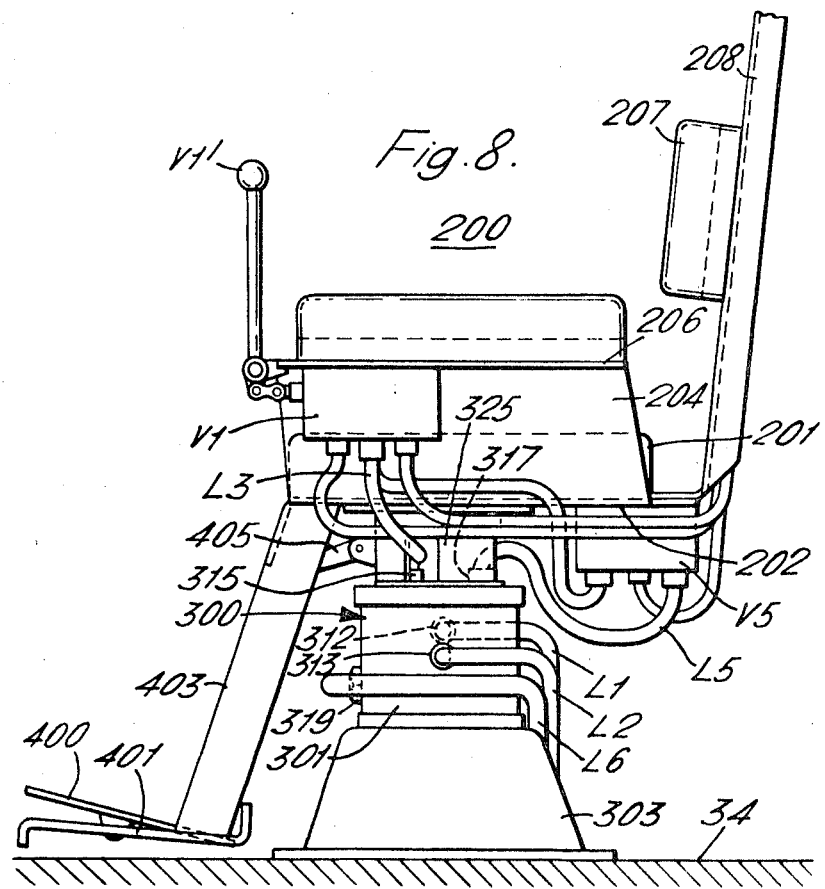

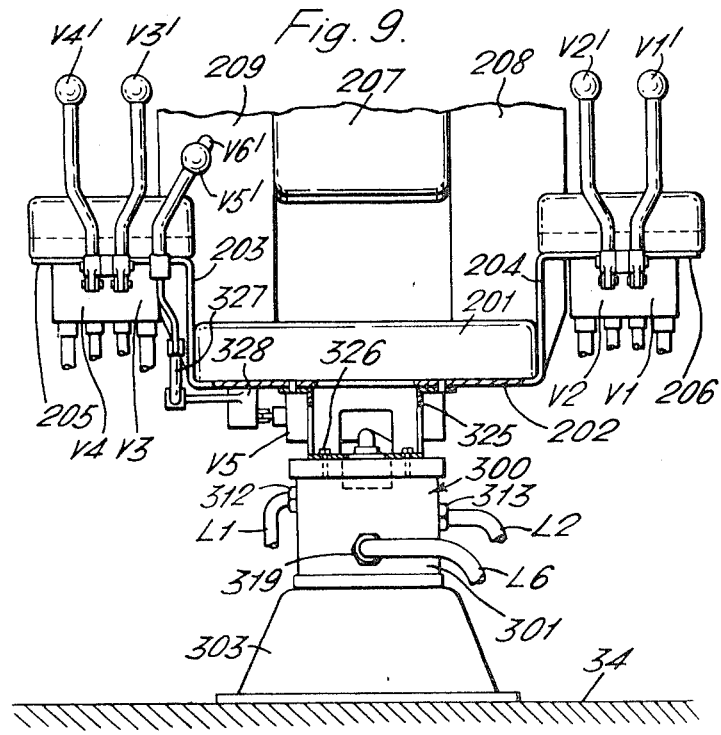
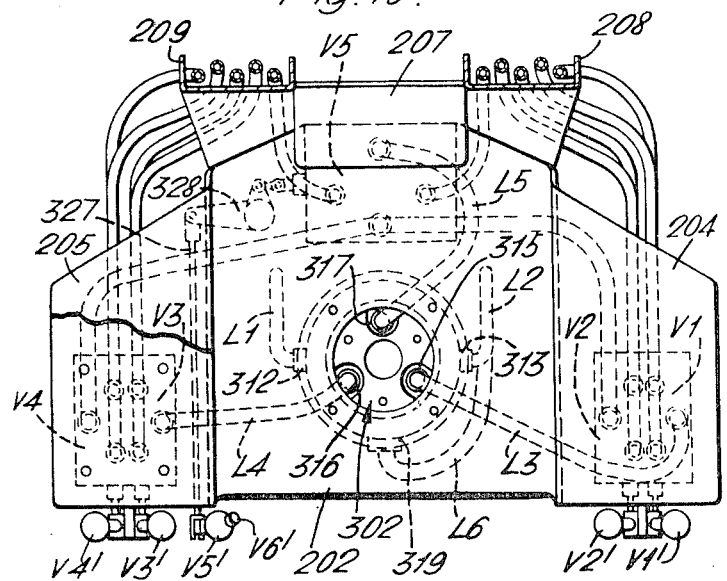

DOUGLAS D. HAMILTON
JOSEPH J. R. BOIVIN
INVENTORS

BY Johnson, Marcou & Wray

ATTORNEY

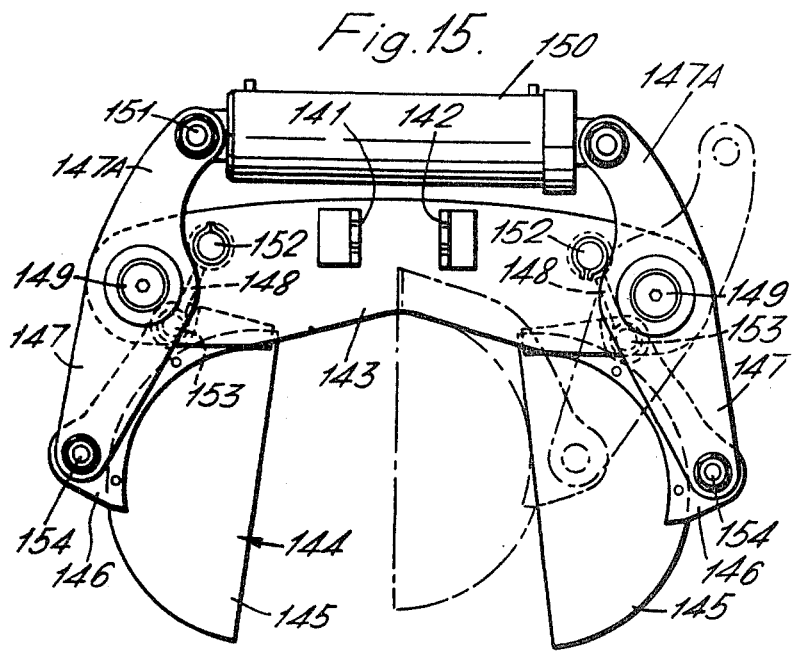
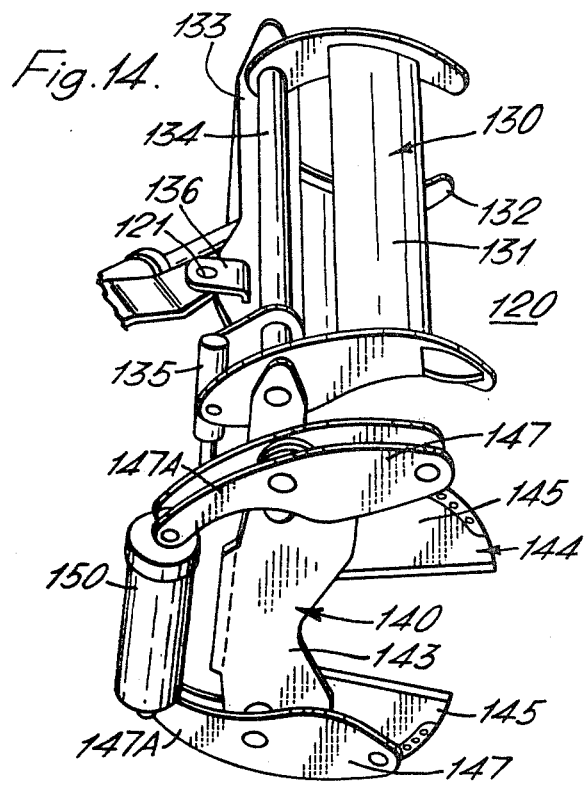

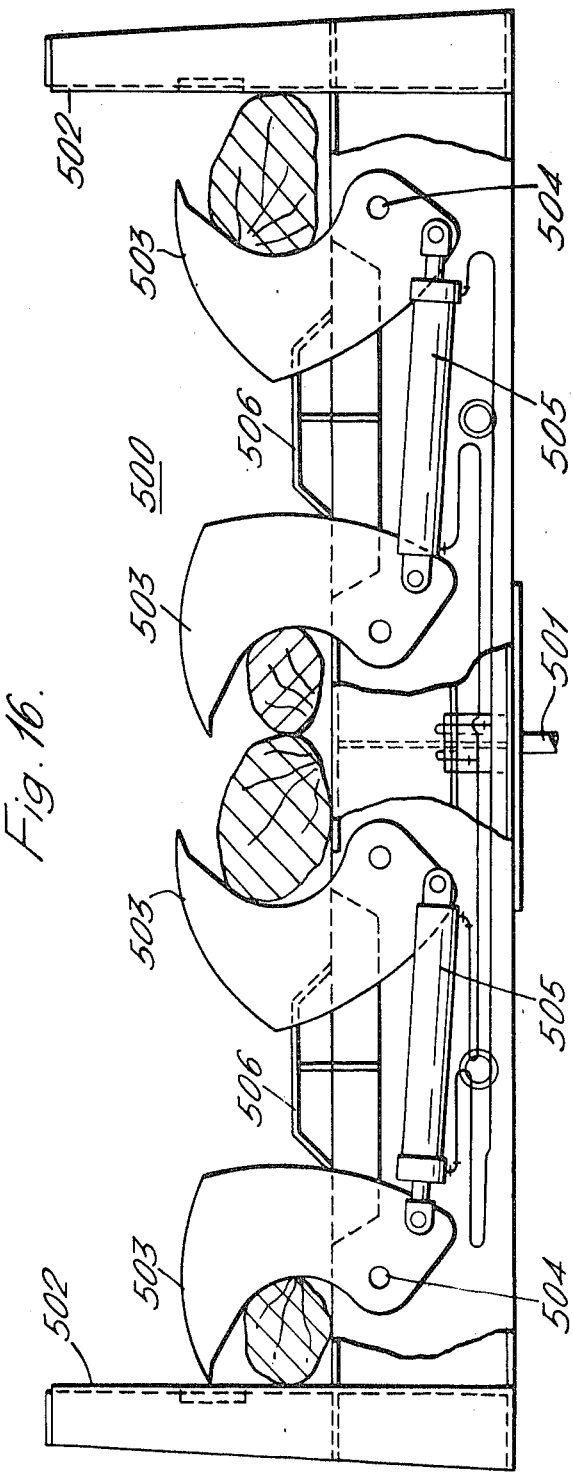

TREE-HANDLING VEHICLE

This invention relates to a tree-handling vehicle for use in logging operations.

There are known vehicles for use in handing trees and which include the combination of a boom and grapple assembly pivotally mounted on the vehicle for use in loading and unloading logs onto and off a load-receiving portion of the vehicle. A typical example of such vehicle is illustrated in B. J. McColl's Canadian Pat. No. 659,445 issued March 12, 1963. The McColl vehicle includes a load-receiving portion which carries the load on one chassis of an articulated vehicle and the boom and grapple assembly is pivotally mounted on the frame of the other chassis. The pivoting or slewing of the boom and grapple is provided by a vertically disposed post to which the extendible and retractable boom is secured.

It is an object of the present invention to provide a more compact and simplified machine of the foregoing general type.

It is a further specific object of the present invention to provide a simplified vehicle of the foregoing type by combining the framework which provides a protected area for the operator and the boom support post into a common structural assembly.

Although there are known various vehicles for handling logs and which vehicles include various features, the prior art has failed to provide a relatively simple and compact vehicle for use in handling trees where such has a two-part chassis and includes the features of a cab mounted extendible and retractable boom assembly on one chassis for listing trees and introducing the same to a log-handling assembly on the other chassis of the vehicle.

A further object of the present invention is to provide a vehicle for handling trees or the like where the boom assembly may be continuously rotated in either direction through a 360° arc about a vertical axis.

A still further object of the present invention is to provide a vehicle for use in handling trees, logs or the like which includes an operator's station and controls of the vehicle for use by the operator, pivotable simultaneously with slewing of the boom about a vertical axis independent of movement of any other portion of the vehicle.

A still further object of the present invention is to provide a tree-handling vehicle with a boom pivotally mounted at the uppermost point of the vehicle and at the approximate geometric plan view center to provide maximum and minimum reach with a minimum length of boom and thereby reduce the tilting forces on the vehicle during operation of the boom assembly in handling trees.

In accordance with one aspect of the present invention, there is provided a tree-handling vehicle comprising in combination, a vehicle having a pair of chassis arranged end-to-end and interconnected, a cab on one chassis providing a protected area for an operator of the vehicle, an extendible and retractable boom pivotally mounted on the cab at a position vertically above the operator for slewing about a vertical axis, said boom having a tree-handling mechanism mounted thereon, and a tree-handling assembly mounted on the other chassis of said vehicle, said boom and tree-handling mechanism being so arranged for engaging a tree, in a selected area adjacent the vehicle, and introducing such tree to the tree-handling assembly on the other chassis. The tree-handling assembly may consist of a bunk with means for embracing one or more trees so that the vehicle may be used to skid such trees to a selected location. Preferably, such bunk is pivotally mounted for movement about a vertical axis. The tree-handling assembly, on the other hand, may consist of any one of a number of processing units either utilized separately or in combination. Processing units may include a shear, a debarker, a delimber and/or a chipper. In the preferred form, the boom assembly pivots about approximately the geometric plan view center of the vehicle and the mounting for such boom is located on the uppermost portion of the machine to provide optimum use of the boom and tree-handling mechanism. The chassis are preferably pivotally interconnected for movement relative to one another about at least a vertical axis to provide an articulated vehicle.

In accordance with a further aspect of the present invention, there is provided a boom mount and operator's station for use on a vehicle comprising in combination, a rotary mounting having a stator and a rotor, said stator being adapted to be secured to a rigid frame of a vehicle, means for pivotally mounting an extendible and retractable boom assembly on said rotor on one side of the frame to which the stator is secured, an operator's station including controls for effecting actuation of operators for the boom assembly and/or accessories thereon, said operator's station and controls being disposed on the side of the frame opposite to that of the boom assembly, means mounting said operator's station including controls for pivotal movement on said frame about an axis parallel to the pivot axis of said rotor, and means interconnecting said operator's station and/or mounting and the rotor for effecting simultaneous pivotal movement of said rotor and operator's station.

In accordance with a further aspect of the present invention, there is provided a mobile vehicle having a chassis, a boom pivotally mounted on the vehicle for rotation about a vertical axis, actuators on the boom for effecting operation of the same including accessories thereon, a power source on said chassis, means connecting the power source and actuators including a rotary coupling, an operator's station disposed below the pivotal mounting of the boom and mounted on the chassis for pivotable movement about a vertical axis and having controls for controlling operation of the actuators, said operator's station and boom assembly being located respectively on opposed sides of a rigid frame assembly secured to said vehicle, and means interconnecting the operator's station and the boom interrelating the pivotal movement thereof about their respective axes.

In accordance with a still further aspect of the present invention, there is provided a machine comprising in combination, a self-propelled vehicle, a rotary mounting secured to said vehicle, a log-handling unit or the like secured to said rotary mounting and having a work-engaging means secured thereto, an operator's station pivotally mounted on said vehicle for rotation about a substantially vertical axis and disposed at a position vertically below said rotary mounting, means interconnecting said operator's station and rotary mounting for simultaneous pivotal movement, means for operating said log-handling unit and work-engaging means thereon, means controlling the operation of said log-handling unit and work-engaging means, said means being secured to said movable operator's station for movement therewith, and a tree bunk on said vehicle to receive and anchor felled trees to the vehicle for skidding the same, said bunk including means to release said tress.

The invention is illustrated, by way of example, in the accompanying drawings wherein:

FIG. 1 is a side elevation of a tree-handling vehicle in accordance with the present invention;

FIG. 2 is a horizontal cross-sectional view of the upper portion of the vehicle illustrating the operator's station including controls for the vehicle;

FIG. 4 is a top plan diagrammatic illustration of the maximum and minimum reach of a boom assembly mounted on the vehicle illustrated in FIGS. 1 to 3 inclusive;

FIG. 7 is a partial sectional view taken substantially along section 7–7 of FIG. 5;

FIG. 8 is a vertical partial side elevational view of the operator's control station and including the operator's support, rotary mount and control valves for controlling operation of the vehicle;

FIG. 9 is a front elevational view of FIG. 8;

FIG. 10 is a top plan view of FIG. 9;

FIG. 14 is a diagrammatic oblique illustration of a tree-handling mechanism adapted to be secured to the boom;

FIG. 15 is a top plan view of the shear portion of the tree-handling mechanism illustrated in FIG. 14;

FIG. 16 is a rear elevational view of an automatic bunk for use on the vehicle illustrated in FIGS. 1 and 2.

GENERAL DESCRIPTION

Figure 3:
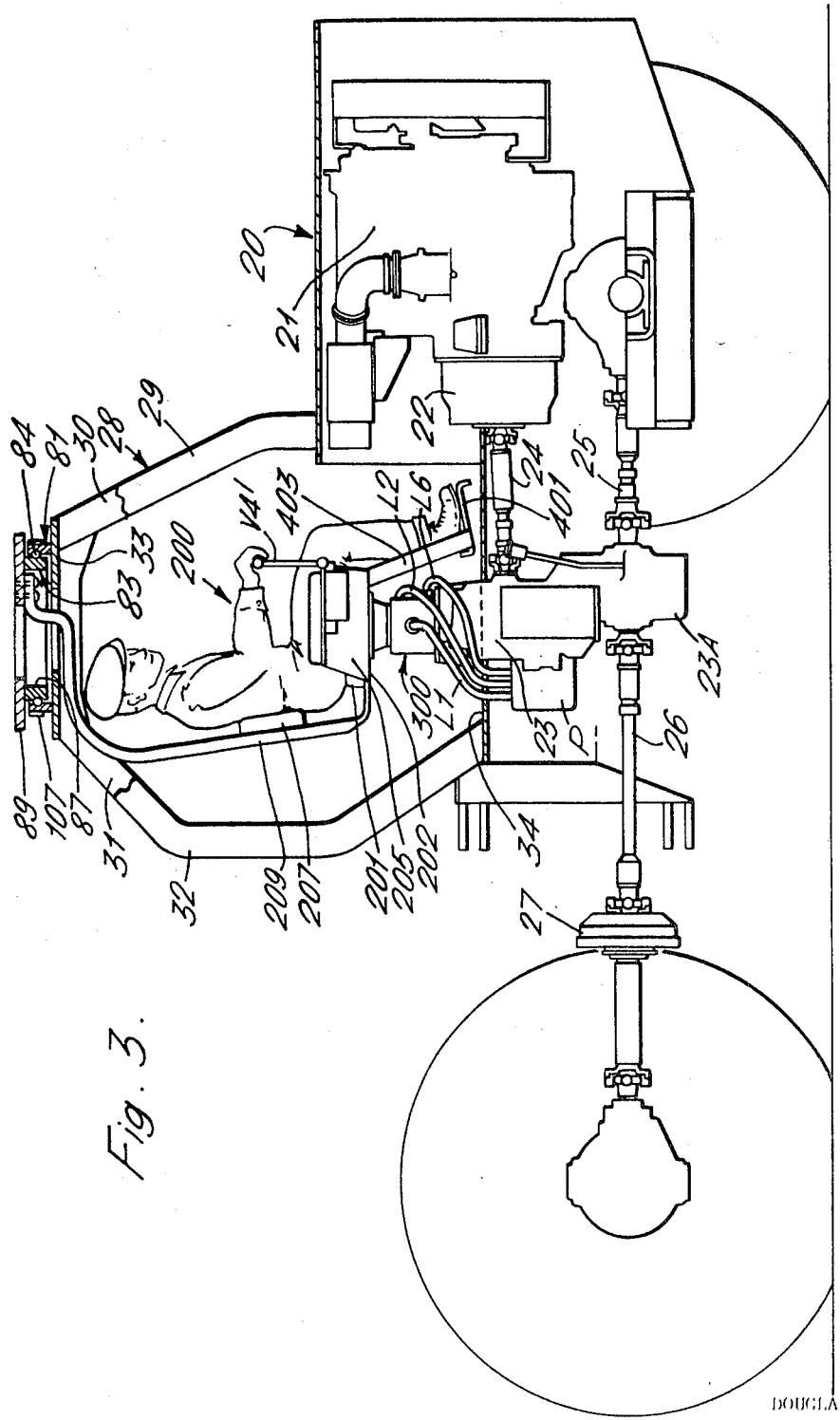
FIG. 3 is a vertical, partial section, diagrammatic illustration of the front chassis of vehicle illustrated in FIGS. 1 and 2, showing the operator's station and mounting for the boom assembly as well as the drive for the entire vehicle.

Referring now in detail to the drawings, shown in FIG. 1 is a tree- or log-handling vehicle 10 consisting of a front chassis 20 and a rear chassis 40 pivotally interconnected for articulated relative movement about a substantially vertical axis A–A. The vehicle further includes a boom assembly 60 pivotally mounted on the front chassis 20 by a rotary mounting 80 and a tree-handling assembly 500 secured to the rear chassis 40. A tree-handling mechanism 120, preferably a felling head consisting of a shear and grapple, is pivotally secured to the boom assembly adjacent the free end thereof. The vehicle consisting of the front and rear respective chassis 20 and 40 constitutes a well-known articulated vehicle, for example, one manufactured by Clark Equipment Company and identified as their "Clark" Ranger Model, "Clark" being a registered Trademark of the Clark Equipment Company.

The vehicle includes (see FIG. 3) a motor assembly 21 mounted on the front chassis and through a torque converter 22, drives a power shift transmission 23 by a drive shaft 24. The transmission 23 includes a lower portion 23A drivingly connected, respectively, to the front and rear chassis 20 and 40 by drive shafts 25 and 26. A service brake 27 may be located in the drive, for example, in the drive shaft 26 as illustrated in FIG. 3. It is to be understood that the wheels of the front and rear chassis are driven through respective front and rear differential mechanisms common to this type of vehicle. The transmission 23 is drivingly connected to the hydraulic pump P providing a source of power for actuating the boom assembly and accessories thereon as will be seen hereinafter.

The front chassis 20 includes a framework 28 providing a protective area surrounding an operator for the vehicle. The framework 28 is a rigid assembly consisting of a plurality of posts 29, 30, 31 and 32 secured rigidly to the frame of the chassis 20. The areas between the posts may be filled with panels, for example, of transparent material such as plastic, glass or the like if desired to provide an enclosure. The posts 31 and 32 each include an upper horizontal portion connected respectively to the vertical posts 29 and 30. A flat plate 33 providing a roof for the operator's cab is secured to such horizontal portions of the posts. The vehicle cab includes a floor plate 34 secured to the chassis 20 and disposed vertically above at least a major portion of the drive train of the vehicle. The rotary mounting 80, to be described hereinafter, used to pivotally mount the assembly 60 on the vehicle is secured to the roof plate 33.

The cab provides a protected area for the operator and located within such cab is an operator's station 200. The operator's station will be described in more detail hereinafter but previously, it will be noted that it includes a support for the operator and controls for the boom assembly as well as accessories thereon. Both the operator's support and the controls are pivotally movable about a vertical axis simultaneously with slewing of the boom assembly.

The log-handling assembly 500, mounted on the rear chassis, may be an automatic bunk which will be described in detail hereinafter, or a processing assembly which may be of the type including a shear, a debarker, a delimber and/or a chipper of any well-known type, for example, that illustrated in U.S. Pat. No. 3,351,107 issued Nov. 7, 1967 or Canadian Pat. No. 792,051 issued Aug. 13, 1968.

The front and rear chassis 20 and 40, as previously mentioned, are pivotally interconnected for articulated movement about the vertical axis A–A. If desired, the front and rear chassis 20 and 40 may be so constructed as to be readily detachable whereby a front chassis 20 may be used with different ones of a plurality of rear chassis 40. The rear chassis 40 may, in one case, have a bunk secured thereto while in another instance may have a processing assembly mounted thereon and the front chassis, which may be used with either, includes a boom assembly thereon having a tree-handling mechanism such as a grapple or felling head for loading, for example, logs onto the bunk in one instance, or in the other instance, feeding logs to the processing assembly.

ROTARY MOUNTING

Figure 5:
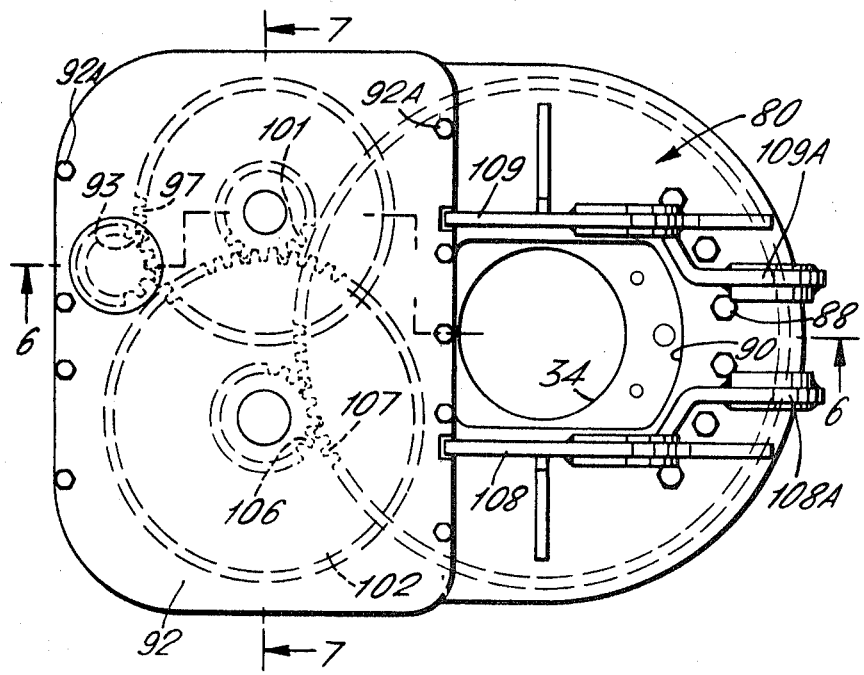
FIG. 5 is a top plan view of the boom mounting.
Figure 6:
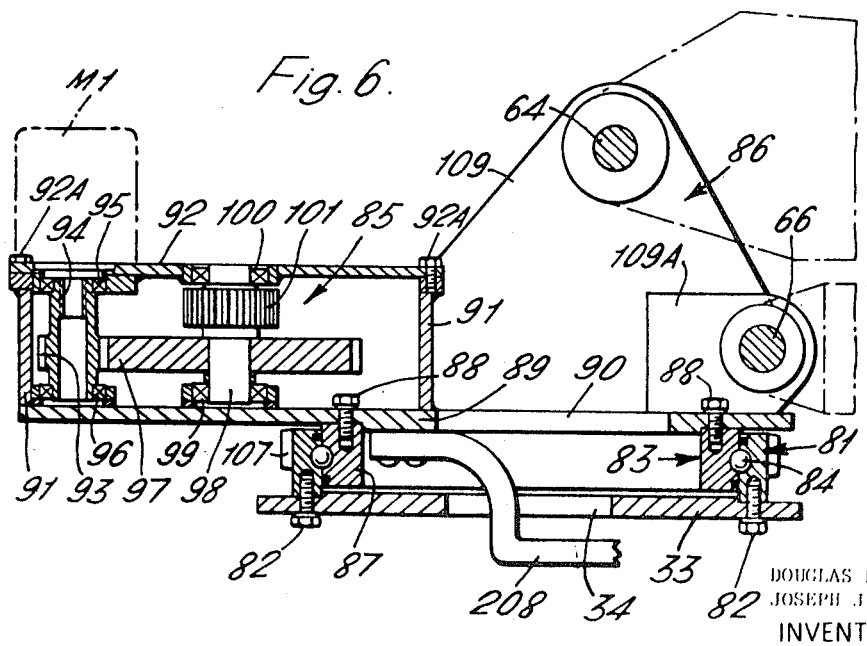
FIG. 6 is a stepped sectional view taken substantially along section 6–6 of FIG. 5.
Figure 11:
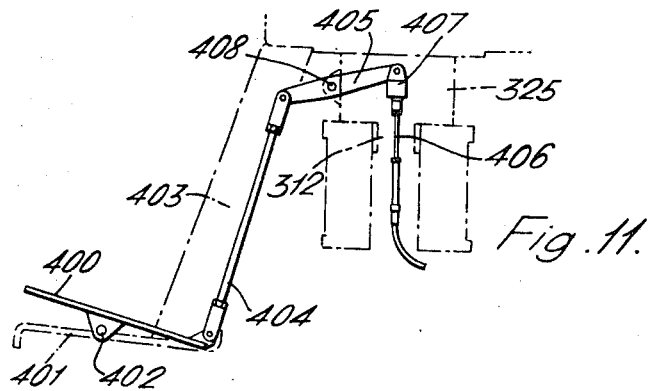
FIG. 11 is a diagrammatic illustration of the throttle control mechanism for the vehicle.
Figure 12:
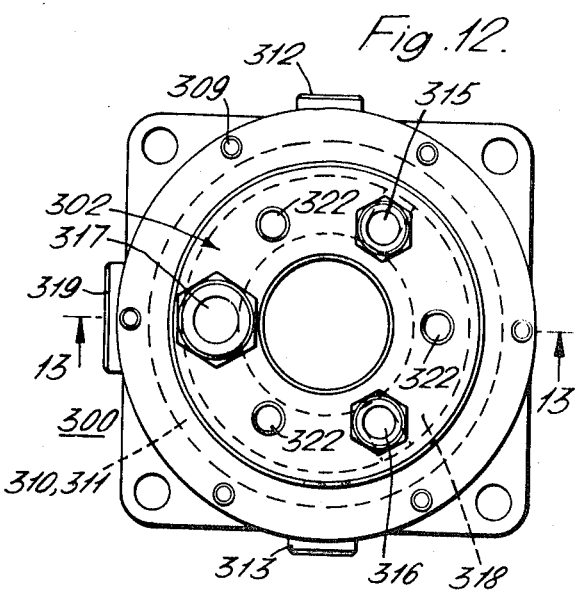
FIG. 12 is a top plan view of the combined rotary mounting for the operator's station and rotary hydraulic coupling between the vehicle power source and the various controls at the operator's station.

Referring now in detail to the various specific components, the rotary mounting 80 (see FIGS. 5 to 7 inclusive) consists of a stator portion 81, detachably secured to the roof plate 33 of the cab by a plurality of studs 82, and a rotor portion 83. The stator 81 and rotor 83 are pivotally interconnected by friction-reducing means such as a plurality of balls 84 interposed therebetween.

The rotor 83 includes a drive transmission assembly 85 and boom mounting 86 detachably secured to an annular element 87 by a plurality of studs 88. The transmission assembly and boom mounting include a baseplate 89 having an aperture 90 located above an aperture 34 in the roof plate 33. Projecting upwardly from the plate 89 is a continuous wall 91 which, together with a cover plate 92 and a portion of the baseplate 89, define a gear housing.

The cover plate 92 is detachably secured to the sidewalls 91 by a plurality of studs 92A and may be readily removed for maintenance of gears located within the gear housing. Located in the gear housing is a gear 93 secured to a hollow ended shaft 94 journaled by bearings 95 and 96 respectively, in the cover plate 92 and the baseplate 89. The hollow end of the shaft is noncircular in cross section and is adapted to receive a correspondingly shaped drive shaft of a motor M1. The motor M1 is a hydraulic motor and is illustrated in phantom in FIG. 6 and may be detachably secured or mounted in any manner on the cover plate 92.

The gear 93 meshes with and drives a gear 97 secured to a shaft 98 journaled by bearings 99 and 100 in respective plates 89 and 92. A further gear 101 is rigidly secured to rotate with the shaft 98 and meshes with a gear 102 secured to a shaft 103 journaled for rotation in the plates 89 and 92 by respective bearings 104 and 105. A gear 106 is secured to the shaft 103 and is located at a position outwardly of the gear housing and adjacent the baseplate 89. The gear 106 meshes with an external ring gear 107 on the outer periphery of the stator 81. From the gear train 93, 97, 101, 102, 106 and 107, it is readily apparent the rotary assembly carrying the boom may be selectively driven by the motor M1 for rotation or slewing about a vertical axis.

The boom mounting 86 includes a pair of lugs 108 and 109 welded or otherwise secured to the baseplate 89 and gear housing wall 91. The lugs are each apertured with such apertures being in alignment to receive a boom mounting pivot pin 64. A further pair of lugs 108A and 109A are secured to respective lugs 108 and 109 and are apertured to receive a hydraulic cylinder pivot mount pin 66.

The lugs 108 and 109 project upwardly above the gear housing and, if desired, the cover plate 92 may be notched to receive a portion of the respective lugs 108 and 109 and thereby serve to locate such cover in a particular position.

BOOM

The boom assembly 60 is pivotally secured to the rotary mounting by pivot pin 64 and consists of a pair of rigid members 61 and 62 pivotally interconnected by a pin 63. Pivotal movement of the member 61 about pin 64 is effected by a hydraulic cylinder 65 pivotally connected to the mounting 80 and the member 61, respectively, by pins 66 and 67. Similarly, a hydraulic cylinder 68 controls pivotal movement of the boom member 62. The hydraulic cylinder assembly 68 is pivotally connected by a pin 69 to the boom member 61, and by a pin 70 to the boom member 62. The hydraulic cylinders 65 and 68 are located respectively, on opposite sides of the member 61 with the hydraulic cylinder 68 being connected to an extension of the member 62 projecting beyond the pivotal connection thereof to the member 61.

TREE-HANDLING MECHANISM

A felling head assembly 120 is pivotally connected by a pin 121 to the free end of the boom member 62. Pivotal movement of the felling head is effected by a hydraulic cylinder 122 pivotally connected to the boom member 62 by a pin 123 and to the felling head through a scissor type of linkage consisting of members 124 and 125. The hydraulic cylinder assembly 122 is pivotally connected to the pair of levers by a common pivot pin 126 and the opposite end of the respective levers are connected by pins 127 and 128 to respectively, the boom member 62 and the felling head 122.

Referring to FIGS. 14 and 15, the felling head 120 consists of a grapple 130 and a shear 140. The grapple 130 consists of a pair of jaws 131 and 132 pivotally connected to a frame 133 for pivotal movement about respective ones of a pair of pivotal mounts 134. Movement of the jaws 131 and 132 toward and away from one another is effected by a hydraulic cylinder 135, actuation of which will be described hereinafter with reference to the hydraulics of the machine.

The frame 134 is pivotally mounted to the boom member 62 by the pin 121 which passes through a pair of lugs 136 rigidly secured to the frame 134.

The shear mechanism 140 is secured to the grapple frame 134 by a pair of lugs 141 and 142 projecting upwardly from a shear frame 143. The shear frame 143 consists of a pair of plates secured together in spaced relation with respect to one another providing a groove or guideway therebetween to receive a portion of respective ones of a pair of relatively movable cutting members 144. Each cutting member 144 includes a cutting blade 145 secured to a holder 146 which is pivotally mounted on the shear frame 143 by a pair of levers 147 and 148. The lever 147 is pivotally secured to the shear frame 143 by a pin 149 and has a rearwardly extending portion 147A pivotally connected to a hydraulic cylinder assembly 150 by a pin 151. The hydraulic cylinder assembly 150 is effectively free floating relative to the shear frame 143 by virtue of being connected to a pair of levers 147 each of which is pivotally connected to the shear frame. Extension and retraction of the hydraulic cylinder 150 effects respectively, closing and opening of the shear blades.

Each link 148 is pivotally secured to the shear frame 143 by a pin 152 and to the knife holder by a pin 153. The lever 147 is also pivotally secured to the blade holder by a further pin 154. The pivot pins 154, 149, 152 and 153 are so located as to cause the cutting edge to follow a desired path. Preferably, such path is arcuate and so oriented as to cause reversal in a component of motion parallel to the length of the blade-cutting edge during severing of an object. This has been more fully described in Canadian Pat. 791,445 issued Aug. 6, 1968. The construction of the grapple and shear mechanism are also more fully described in such application.

The hydraulic circuit and controls concerning operation of the slewing motor M1, the hydraulic boom tilt cylinders 65 and 68, the felling head tilt cylinder 122, the grapple cylinder 135, and shear cylinder 150 will be described in detail hereinafter with reference to the hydraulic schematic.

OPERATOR'S STATION

As previously mentioned, the operator's station 200 is located in a protected area and includes a support for the operator and controls for the vehicle, both of which move simultaneously with slewing of the boom. Referring to FIGS. 1 to 3 and 8 to 10 inclusive, the operator's station 200 includes a support for the operator which is rotatable along with slewing motion of the boom assembly. The operator's support includes a seat portion 201 consisting of an upholstered cushion or the like on a substantially flat surface or base 202 having opposed sidewalls 203 and 204 directed upwardly and terminating in respective ones of horizontally extending portions 205 and 206. The latter include upholstered cushions forming arm rests for the operator, and in addition, provide a support to carry control valves for the hydraulic system of the vehicle.

The operator's station 200 includes a back rest 207 secured to a pair of channel members 208 and 209 which, in turn, are secured at one end to the horizontal seat portion 202 by bolts or the like and at the other end to the rotor 83.

The channel members 208 and 209, as will be seen hereinafter, provide guideways to receive hydraulic hoses leading from the control valves on the arm rests and operator's seat to the boom slewing motor and control cylinders and the actuating cylinders of accessories mounted on the boom. The back rest 207 may be an upholstered member rigidly secured to the channel members 208 and 209 or alternatively, may be mounted so as to be vertically adjustable and/or tiltable to accommodate and provide comfort for various operators. The members 208 and 209 may be utilized to suspend the operator's support from the rotor 83 of the boom assembly and thereby bear the entire or any portion of the weight of the support and the operator. A portion of such weight may be taken by a support pivotally connecting the seat portion 202 to the chassis floor plate 34 as will become apparent hereinafter.

As previously mentioned, the operator's support carries control valves for effecting actuation of hydraulic cylinders and motors. Fluid from the pump P1 is conducted through a rotary coupling 300 to the control valves located on the pivotable operator's support. The rotary coupling serves as at least a partial support for the operator's station 200 and is illustrated in FIGS. 8 to 13 inclusive.

ROTARY COUPLING

The rotary coupling which, in effect, is a combined rotary coupling and mounting, generally designated 300, consists of a stationary portion 301 and a rotary portion 302. The stationary portion is secured to the chassis floor plate 33 by a hollow pedestal base 303 located vertically above the power transmission 23. The stator portion 301 of the rotary coupling 300 may be bolted to the pedestal or secured in any convenient manner.

Figure 13:
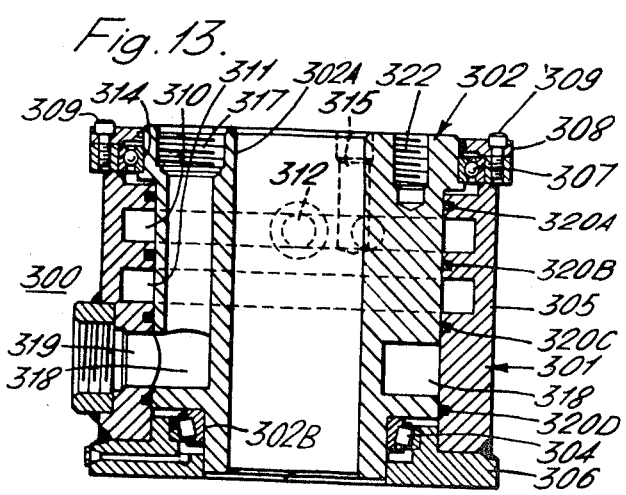
FIG. 13 is a cross-sectional view taken substantially along section 13–13 of FIG. 12.

In order to carry the weight of the operator's station, an end thrust bearing 304 is interposed between the rotor and stator whereby the rotary coupling 300 assumes at least a portion of the weight of the operator and/or operator support. As illustrated in FIG. 13, the rotary coupling stator 301 consists of a generally cylindrical portion 305 terminating at the lower end in an inwardly directed flange portion 306 providing one seat for the end thrust bearing 304. The opposite end of the cylindrical member 305 terminates in a groove on the internal surface receiving a bearing 307 held captive by a bearing end plate 308 secured to the end of the sidewall 305 by a plurality of studs 309. The inner wall of the cylindrical stator 305 is provided with a pair of annular grooves or fluid channels 310 and 311. The channels 310 and 311 are connected respectively to ports 312 and 313 in the stator wall 305 and such ports are located diametrically opposite one another.

The rotor 302 consists of a cylindrical member having an outer surface closely fitting the inner surface of the cylindrical stator 301. The rotor 302 includes a central axial bore 302A surrounded by a cylindrical wall terminating at the lower end in an outer groove portion 302B providing a seat for the other race portion of the end thrust bearing 304. The opposite end of the rotor terminates in an outwardly directed enlarged rib 314 which bears against the bearing member 307. It is thus readily apparent the rotor 302 is journaled in the stator 301 for rotational movement about the axis of the bore 302A and the bearings are so arranged the rotor can support an end thrust type of load.

The rotor 302 includes three axial passageways 315, 316 and 317 displaced approximately 120° from one another and terminate at various positions in the rotor. The passageway 317 terminates in an annular groove 318 in the outer wall of the rotor at a position vertically below the channels 310 and 311 in the stator. Similarly, the passageways 315 and 316 terminate in the outer wall of the rotor respectively in the stator channels 310 and 311. The channels 310, 311 and 318 form passageways by virtue of the stator and rotor adjacent surfaces coacting to separate one channel from the other. A plurality of seals separate the channels from one another and from opposed ends of the coupling. A seal 320A is located between the channel 310 and the bearing 307. A seal 320B is disposed intermediate the channels 310 and 311 while a seal 320C is located intermediate the channel 311 and the channel 318. The lowermost seal, 320D, is located between the channel 318 and the lower end of the assembly. The channel 318 in the rotor communicates with a port 319 in the stator wall 305.

The rotor 302 has three tapped recesses 322 directly downwardly from the upper end and such recesses are displaced approximately 120° from one another at positions intermediate the passages 315, 316 and 317. A seat support and spacer member 325 is secured as by bolts or the like to the seat 202 at one end and it is attached at the other end to the rotor by studs 326 in each of the tapped holes 322. From this it can be seen that the operator's support is at least partially, if not entirely, supported by the rotary coupling.

As previously mentioned, the operator's station includes arm rests 205 and 206 directed laterally outwardly. Arm rest 205 provides a support for a pair of valves V1 and V2 having respective actuating levers V1' and V2'. The valves V1 and V2 are suspended below the arm rest 206 and similarly, a pair of valves V3 and V4 are suspended below the arm rest member 205 which, in turn, are controlled by respective levers V3' and V4' projecting upwardly above the arm rest. A further valve V5 is suspended from the seat member 202 and is actuated by a lever V5' through a pair of links 327 and 328. The lever V5' is pivotally mounted on the arm 205 and the link 328 is pivotally mounted on the seat member 202. Movement of the lever arm V5' accordingly effects actuation of the valve V5.

The valves V1 to V5 inclusive are connected as illustrated in the schematic of the hydraulic system described hereinafter with reference to FIG. 17.

The accelerator of the vehicle motor 21 consists of a foot pedal 400 pivotally secured to a foot rest 401 by a pivot pin 402. The foot rest 401 is a generally horizontal plate suspended from the seat member 202 by a pair of struts 403. The pedal 400, through a linkage mechanism consisting of members 404, 405, effects movement of a Bowden cable or the like 406 connected to the throttle control of the motor 21. The link member 405 is pivotally secured to the seat mounting bracket 325 by a pin 408 and has a portion terminating inwardly thereof vertically above the central aperture 302A of the coupling. The Bowden 406 is preferably connected to the link 405 by a rotary connector 407 and the flexible cable 406 extends downwardly through the central aperture 312 of the coupling.

From the foregoing, it can be seen that the operator, along with the controls, is free to pivot about a vertical axis coincident with the rotational axis of the rotary coupling 300. The axis of such rotation is preferably coincident with the rotation of the rotary mounting 80 utilized to pivotally mount the boom assembly on the cab of the vehicle.

LOG-HANDLING ASSEMBLY

As previously mentioned, the rear chassis 40 has a log-handling assembly 500 secured thereto. Referring to FIG. 16, there is illustrated an automatic bunk of the type disclosed and claimed in Canadian Pat. No. 824,003 issued Sept. 30, 1969. The bunk consists of a generally horizontal member pivotally secured to the chassis 40 by a pin 501 for rotational movement about a vertical axis. A pair of posts 502 project upwardly from the horizontal member adjacent each of the opposed ends thereof. A plurality of tonglike members 503 are each pivotally secured to the horizontal member by a pin 504 and such tonglike members are disposed in spaced relation longitudinally along the horizontal portion of the bunk. A pair of tong members 503 are located one each respectively adjacent the upstanding posts 502 and in spaced relation therewith so as to cooperate for engaging a tree therebetween as illustrated in the drawing. A further pair of tonglike members 503 are located adjacent the center of the bunk for movement in a direction toward and away from one another to cooperate with one another for engaging one or more trees. Adjacent pairs of tongs 503 are interconnected for interrelated movement by a hydraulic cylinder 505. The tongs may be pivoted to a retracted position whereby they are located generally below guard members 506 projecting upwardly from the bunk to facilitate unloading trees off the bunk. Alternatively, they may be pivoted to the opposite position for engaging and locking trees on the bunk whereby the vehicle may be utilized as a skidder grasping one end of the trees and trailing the remaining portion thereof on the ground.

The bunk effectively provides a relatively low profile and a layer of trees may be anchored by the tongs adjacent the horizontal upper surface of the bunk. Subsequent trees may be piled on the locked layer of trees and the entire load skidded to a selected location.

As previously mentioned, the bunk 500 may be replaced by a processing assembly including a delimber, a debarker and/or a shear, and such combination of processing units has been described and claimed in applicant's aforementioned copending Canadian applications 810,316 and 940,803. In the case of the bunk, it is pivotally mounted for movement about a vertical axis and in the event a processing assembly is utilized, it too is preferably pivoted about a vertical axis. In the latter instance, however, the processing assembly is also preferably pivotally mounted for movement about a horizontal axis whereby trees being processed may follow a continually changing path caused by one end of the tree being supported on the ground while being dragged into the machine by feed rolls or the like feed mechanism.

HYDRAULIC CIRCUITRY

Figure 17:
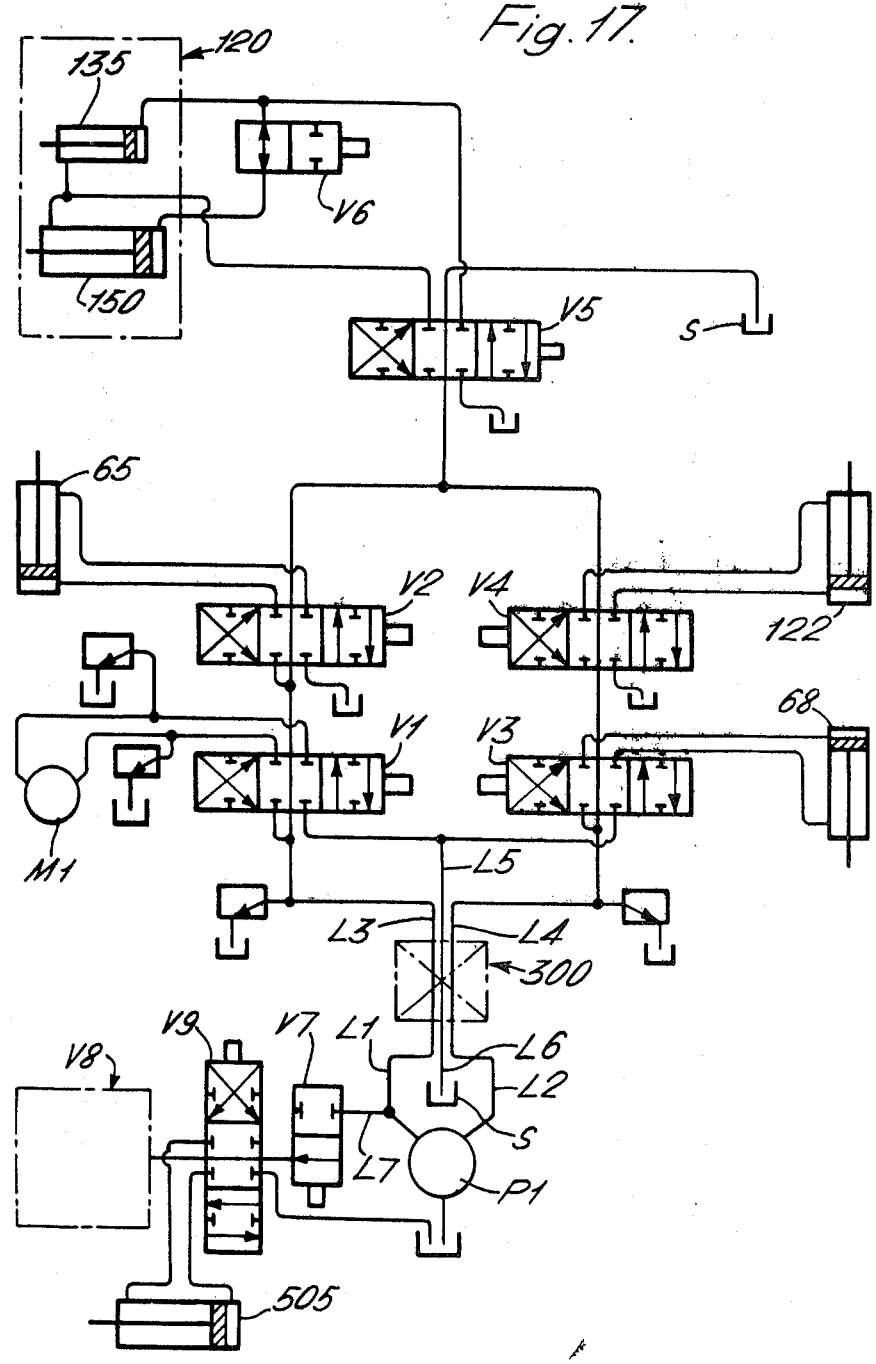
FIG. 17 is a schematic of the hydraulic circuitry.

Referring now to FIG. 17, high pressure fluid from the pump P1 is supplied by lines L1 and L2 to the stator portion of the rotary coupling 300 and are connected, respectively, to ports 312 and 313. The ports 312 and 313 are connected by passages in the coupling respectively to passages 315 and 316 in the rotor portion via grooves 310 and 311. The passages 315 and 316 are connected, respectively, to lines L3 and L4 providing fluid, under pressure, to valves V1 to V5 inclusive and a fluid return to the rotary coupling is provided through line L5. The line L5 is connected to passage 317 of the rotor portion of the rotary coupling which, as previously described, is in communication via channel 318 with port 319 in the stator portion of the coupling. The port 319 is connected by a line L6 to a sump S.

Valve V1 is a manually operated three-way valve located below the operator's left-hand arm rest and controls operation of the slewing motor M1. The valve V2 is also a manually operated three-way valve located adjacent the valve V1 under the left-hand arm rest, and controls operation of the boom cylinder 65. Valves V3 and V4 are each manually operated three-way valves located below the right-hand arm rest and control operation, respectively, of the boom cylinder 68 and the felling head tilt cylinder 122. The valve V5 is located vertically below the operator's seat and controls operation of the felling head shear cylinder 150 as well as the felling head grapple cylinder 135. In order to interrelate the operation of the grapple jaws and the shear blades, a further valve V6 is interposed between the valve V5 and the grapple and shear respective cylinders 135 and 150. The valve V6 is located on the boom member 62 adjacent the felling head tilt cylinder 92 and permits actuation of the shear cylinder after selectively positioning valve V5 to move the grapple jaws to a closed position.

In order to actuate the valves, lever arms are provided, valves V1 to V5 inclusive being controlled by respective levers V1', V2', V3', V4' and V5'. The levers V1' to V4' inclusive are connected directly to the stems of the respective valves while the lever V5' is indirectly connected through a linkage mechanism.

Valve V6 is a solenoid controlled valve actuated by a pushbutton member V6' incorporated in the valve actuator lever V5'.

As previously mentioned, the rotary coupling 300 is interposed between the fluid pressure source and the valves and cylinders. The piping lines necessary for the various circuits from the rotary joint to the valves are connected below the operator's seat and the further lines from the valves to the boom rotary mounting are located in the channel members 208 and 209. It will thus be readily apparent the conduits for the various circuits may be rigid instead of the normal flexible hoses utilized on hydraulically operated boom assemblies. This feature is important when one considers that pressures utilized in the system run in the neighborhood of 2,500 p.s.i. A further feature to note is that the operator is protected from the lines by virtue of having the lines located in the channels 208 and 209 and also below a metal member consisting of portions 202, 205 and 206 forming the seat and arm rests for the operator.

A further series of valves may be secured to the vehicle chassis, for example, the frame 28, and which may be used to control operation of the bunk, steer the vehicle and/or control stabilizers. In the schematic illustrated in FIG. 17 and in FIG. 1, there is indicated a valve V7 having an actuator V7' for controlling fluid to a valve V9 controlling bunk cylinders 505 and further valves generally identified as V8. In FIG. 17, the valve V7 is connected to the line L1 by a line L7. The valve block assembly V8 may be utilized to control stabilizers and/or, as previously mentioned, steer the vehicle. In FIG. 1, the valve V8 is located adjacent the operator and is controlled by a lever V8'. It is obvious that the valves V8 and V9 may be duplicated and located at various locations surrounding the operator to facilitate operating the vehicle. For example, one set of valves may be located immediately behind the operator while a second set of valves and/or actuators may be located immediately in front of the operator.

OPERATION

The operator drives the self-propelled vehicle into a location for use, for example, a forest and, by suitably manipulating valves V1, V2, V3 and V4, positions the felling head adjacent the base of the tree with the tree located between the grapple jaws and the shear blades. With the felling head suitably positioned, by actuation of the valve V5 the tree may be grasped by the grapple and subsequent operation of the valve V6 may be such as to close the shear blades and sever the standing tree. The operator then suitably manipulates valves V1 to V4 inclusive, moving the felled tree to a position behind the vehicle and places the butt end of the tree on the bunk 500. Several such operations may be performed placing as many trees on the bunk as can be done without further maneuvering the vehicle. After an area has been cleared, the vehicle may be maneuvered and the steps repeated, felling and loading further trees on the bunk. After sufficient trees have been placed on the bunk to form at least one row on the horizontal portion, the valve V9 controlling the bunk cylinders 505 is actuated to move the tongs 503 into the position illustrated in FIG. 16 to anchor the trees to the bunk. Further trees may be placed on the locked or anchored layer of trees and the entire load skidded by the vehicle to a suitable location.

The rotary coupling 300 and the rotary mounting 80 enables the operator and boom assembly to continuously rotate through 360°. In FIG. 4, there is diagrammatically illustrated a top plan view of the vehicle, slewing of the boom assembly being about a vertical axis B. This axis is located slightly forwardly of the pivot axis A-A of the articulated vehicle. A dot and dash circle C in FIG. 4 indicates generally the maximum reach of the boom and this circumscribes an inner circle D indicating the minimum reach of the boom. It is obvious that felling of trees will take place either to the right or the left of the vehicle or immediately ahead of the vehicle and arcuate movement of the boom to reach this area is approximately 320°, as indicated by the arrow E. The remaining 40° of arcuate movement permits placing the felled tree on the bunk 500 on the rear chassis of the vehicle. Continuous rotational movement provided by the rotary mounting and the rotary coupling minimizes the amount of slewing required to fell trees in the area between circles C and D in the arc E and place the felled trees on the bunk of the vehicle. Placing the boom to pivot about the axis B at a position almost at the geometric plan view center, renders greatest stability of the vehicle while permitting maximum and minimum reach, i.e. between circles C and D, utilizing a minimum length of boom.

We claim:
1. A tree-handling vehicle comprising in combination:
    a. an articulated mobile vehicle having a pair of chassis arranged end-to-end and interconnected;
    b. a structural assembly rigidly secured to one of said chassis and providing a protected area for an operator of the vehicle;
    c. an operator's station disposed within said protected area and pivotally mounted for rotation about a substantially vertical axis, said operator's station including controls for effecting actuation of operators for said vehicle and components thereon;
    d. an extendible and retractable boom pivotally mounted on said structural assembly, at a position vertically above the operator's station for slewing about a vertical axis;
    e. means interconnecting said operator's station and said pivotally mounted extendible and retractable boom for simultaneous pivotal movement about their respective axes;
    f. a tree-handling mechanism mounted on said boom; and
    g. a tree-handling assembly mounted on the other chassis of said vehicle, said boom and tree-handling mechanism being so arranged for engaging a tree in a selected area adjacent the vehicle and introducing such tree to the tree-handling assembly on the other chassis.

2. A vehicle as defined in claim 1 wherein said operator's station and boom assembly are pivotable about a common vertical axis.

3. A vehicle as defined in claim 1 wherein said operator's station includes a chair type support for an operator and a plurality of controls secured to said support.

4. A vehicle as defined in claim 3, wherein said operator's support comprises a seat member at least partially supported on the vehicle by a rotary coupling and wherein said rotary coupling includes means interconnecting the power source on the vehicle chassis and the actuators on the operator's station for effecting actuation of the boom assembly and accessories mounted thereon.

5. A vehicle as defined in claim 4 wherein said rotary coupling is located in hydraulic circuitry interposed between a prime mover on one chassis and controllers including actuators on the rotatable portion of the boom assembly and operator's station.